(12) United States Patent
Linde

(10) Patent No.: US 11,296,360 B2
(45) Date of Patent: Apr. 5, 2022

(54) BATTERY CORE FOR A SANDWICH COMPONENT

(71) Applicant: Airbus Operations GmbH, Hamburg (DE)

(72) Inventor: Peter Linde, Hamburg (DE)

(73) Assignee: Airbus Operations GmbH

( * ) Notice: Subject to any disclaimer, the term of this patent is extended or adjusted under 35 U.S.C. 154(b) by 243 days.

(21) Appl. No.: 16/152,810

(22) Filed: Oct. 5, 2018

(65) Prior Publication Data

US 2019/0165421 A1    May 30, 2019

(30) Foreign Application Priority Data

Nov. 27, 2017  (DE) .................... 10 2017 128 016.2

(51) Int. Cl.
| | | |
|---|---|---|
| H01M 10/0583 | (2010.01) | |
| H01M 4/587 | (2010.01) | |
| H01M 4/58 | (2010.01) | |
| B64D 41/00 | (2006.01) | |
| H01M 4/62 | (2006.01) | |
| H01M 10/04 | (2006.01) | |
| H01M 10/0525 | (2010.01) | |
| H01M 50/44 | (2021.01) | |

(Continued)

(52) U.S. Cl.
CPC ........ *H01M 10/0583* (2013.01); *B64D 41/00* (2013.01); *H01M 4/587* (2013.01); *H01M 4/5825* (2013.01); *H01M 4/62* (2013.01); *H01M 10/045* (2013.01); *H01M 10/0525* (2013.01); *H01M 50/4295* (2021.01); *H01M 50/431* (2021.01); *H01M 50/44* (2021.01); *B64D 2221/00* (2013.01); *H01M 2220/20* (2013.01)

(58) Field of Classification Search
CPC .......... H01M 10/0525; H01M 10/052; H01M 10/0583; H01M 50/44
See application file for complete search history.

(56) References Cited

U.S. PATENT DOCUMENTS

| | | |
|---|---|---|
| 5,567,544 A | 10/1996 | Lyman |
| 2011/0183180 A1* | 7/2011 | Yu ........................ H01M 12/005 429/128 |
| 2014/0255782 A1 | 9/2014 | Jabbour et al. |

(Continued)

FOREIGN PATENT DOCUMENTS

| | | | |
|---|---|---|---|
| DE | 102012018158 A1 | | 4/2014 |
| WO | WO2016071573 | * | 5/2016 |

OTHER PUBLICATIONS

Choi et al. (Nano Lett. 2014, 14, 5677-5686).*

*Primary Examiner* — Olatunji A Godo
(74) *Attorney, Agent, or Firm* — Lerner, David, Littenberg, Krumholz & Mentlik, LLP

(57) ABSTRACT

A battery core has a positive electrode layer, a separator layer and a negative electrode layer. The separator layer is arranged between the positive electrode layer and the negative electrode layer. The positive electrode layer, the separator layer and the negative electrode layer have nanocellulose fibres. The battery core is folded and forms a cellular structure as a core for a sandwich component. The sandwich component has an upper covering layer, a lower covering layer and a battery core. The battery core is arranged between the upper covering layer and the lower covering layer. A method for producing such a battery core is also described.

15 Claims, 3 Drawing Sheets

(51) Int. Cl.
*H01M 50/431* (2021.01)
*H01M 50/429* (2021.01)

(56) References Cited

U.S. PATENT DOCUMENTS

2016/0315352 A1* 10/2016 Jiang .................. H01M 10/052
2017/0346059 A1* 11/2017 Kunnari .................... C08L 1/02

* cited by examiner

BATTERY CORE FOR A SANDWICH COMPONENT

FIELD OF THE INVENTION

The present invention relates to a battery core, to a sandwich component having such a battery core, to an aircraft having such a sandwich component, and to a method for producing a battery core.

BACKGROUND OF THE INVENTION

Lightweight construction plays a major role in the aircraft industry. In this context, it is important that the installed parts in an aircraft are light and, at the same time, have the necessary strength.

In this connection, it is desirable inter alia to use multifunctional parts in an aircraft, i.e. to combine several functions in one component. This reduces the number of parts and saves weight and space. In particular, it is desirable for energy storage devices (batteries) in an aircraft to be installed in a lightweight and space-saving way in the aircraft.

DE 102012018158 A1 describes a structural component, in particular for an aircraft, wherein, in a sandwich structure comprising covering layers and a core structure arranged therebetween, at least one energy storage element is integrated into the core structure and reinforces the latter.

It is furthermore known to use lignin for the layers of a battery in order to produce ultra-thin flexible batteries. Lignin is an environmentally friendly substance from the group of biopolymers and is obtained from the cellulose industry. Lignin is used as a binder for flexible lithium ion batteries. It has been found that a cathode, an anode and a separator material can be integrated into the lignin-based binder.

However, the mechanical flexibility properties of binders produced on the basis of lignin are not satisfactory.

BRIEF SUMMARY OF THE INVENTION

An aspect of the present invention may supply a battery which is both space saving and also lightweight.

According to a first aspect of the invention, a battery core for a sandwich component is provided. The battery core has a positive electrode layer, a separator layer and a negative electrode layer. The separator layer is arranged between the positive electrode layer and the negative electrode layer. The positive electrode layer, the separator layer and the negative electrode layer have nanocellulose fibres. The battery core is folded and forms a cellular structure as a core for a sandwich component.

In one example, the battery core has a plurality of layers comprising a positive electrode layer, a separator layer and a negative electrode layer.

The positive electrode layer can also be referred to as a cathode. The negative electrode layer can also be referred to as an anode.

The separator layer refers to a layer between the cathode and the anode and separates these from one another.

An arrangement comprising a positive electrode layer, a negative electrode layer and a separator layer of the battery core can also be referred to as a battery strip. A battery core can thus have one or more battery strips.

The addition of nanocellulose fibres to the layers has the effect that a battery core has both better mechanical properties and also electrochemical properties. This is achieved by virtue of the fact that the individual layers have nanocellulose fibres. As a result, the battery core can be folded in various ways and used as a cellular structure of a sandwich component. Nanocellulose fibres are fibres of variable length (0.1 to several micrometres) and have a diameter of 5 to 60 nanometres. In water, even small concentrations form very firm gels and, as additives, they therefore make it possible to produce components of good mechanical stability with, at the same time, good flexible mechanical properties. It is possible in this context to form thin battery cores of paper-like consistency. This opens up several possibilities for making the battery core in various shapes, e.g. by folding. For example, the thin battery cores can be folded in such a way that they can be integrated into various components, preferably into a sandwich component. By virtue of the nanocellulose fibres, the folded battery strips also have good stiffness. The folding further increases the stiffness of the battery strip. Thus, the invention provides a battery which is both space saving and lightweight.

According to one example, the positive electrode layer comprises $LiFePO_4$. In one example, the $LiFePO_4$ is mixed with nanocellulose fibres distributed in water.

According to one example, the separator layer comprises $SiO_2$. In one example, the $SiO_2$ is mixed with nanocellulose fibres distributed in water.

According to one example, the negative electrode layer comprises graphite. In one example, the graphite is mixed with nanocellulose fibres distributed in water.

By virtue of the substances mentioned, the battery core is very environmentally friendly.

According to one example, the battery core has a thickness of at most 0.5 mm, preferably 0.3 mm. By virtue of these very thin battery cores, it is possible to make lightweight cellular structures for a sandwich component.

According to one example, the cellular structure has a honeycomb structure or a Miura structure or has quadrilateral cells. This enables various load-bearing properties, i.e. structural properties, to be achieved.

In another example, it is also conceivable to form curved cellular structure patterns with the battery core.

In one example, the layers of the battery core can be arranged in series or in parallel. This enables the battery core to be designed for different voltage requirements or capacitances.

According to one example, the battery core is flexible. This enables the produced battery core in various forms to be integrated into structural components.

According to a second aspect of the invention, a sandwich component is furthermore provided, which comprises an upper covering layer, a lower covering layer and a battery core. The battery core is arranged between the upper covering layer and the lower covering layer.

Using nanocellulose fibres enables the layers of the battery core to be folded in a flexible manner while nevertheless having a required strength. As a result, it is possible to replace a conventional cellular core for a sandwich component, consisting, for example, of paper folded into a cellular form, with a cellular core which has comparable structural properties to the conventional cellular core and is simultaneously a battery. This has the effect that it is possible to make a multifunctional sandwich component which, in addition to properties as a support, also has properties as an energy storage device or energy source.

According to one example, the sandwich component has a connection device for the connection of an electrical conductor to the battery core. This enables an electric load to be connected to the battery core.

In another example, the battery core is connected to a power source in order to charge the battery core or to enable the battery core to serve as a buffer store.

In one example, the connection device is arranged on the upper cover plate.

In another example, the connection device is arranged on the lower cover plate.

In another example, the connection device is arranged on the battery core.

According to one example, an aircraft is provided which has a sandwich component with a battery core and has a load. The electric load is connected in an electrically conductive manner to the battery core and/or to the sandwich component.

According to a third aspect of the invention, a method for producing a folded battery core is furthermore indicated. The method comprises the following steps. In a step a), a battery strip is supplied, which has a positive electrode layer, a separator layer and a negative electrode layer. The separator layer is arranged between the positive electrode layer and the negative electrode layer, and all the layers comprise nanocellulose fibres. In a step b), the battery strip is folded into a battery core having a cellular structure as a core for a sandwich component.

According to one example, the method additionally has the following step. In a step c), interfaces between the cells of the cellular structure of the folded battery core are adhesively bonded.

According to another example, the method additionally has the following step. In a step d), the battery core is connected to an upper covering layer and a lower covering layer.

It should be noted that the features of the illustrative embodiments of the system also apply to embodiments of the cabin segment and of the vehicle and vice versa. Moreover, it is also possible to freely combine those features where this is not explicitly mentioned.

These and other aspects of the invention will become apparent in relation to and with reference to the following statements.

BRIEF DESCRIPTION OF THE DRAWINGS

Illustrative embodiments of the invention are described below with reference to the figures, of which.

DETAILED DESCRIPTION

Figure 1:
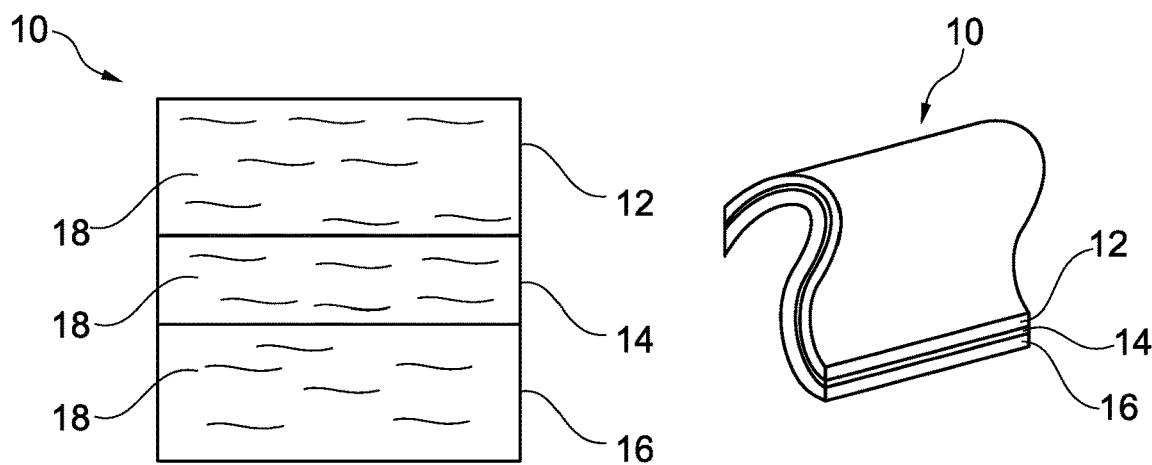
FIG. 1 shows a schematic cross-sectional illustration of the battery core and an embodiment of such a battery core in curved form.
Figure 2:
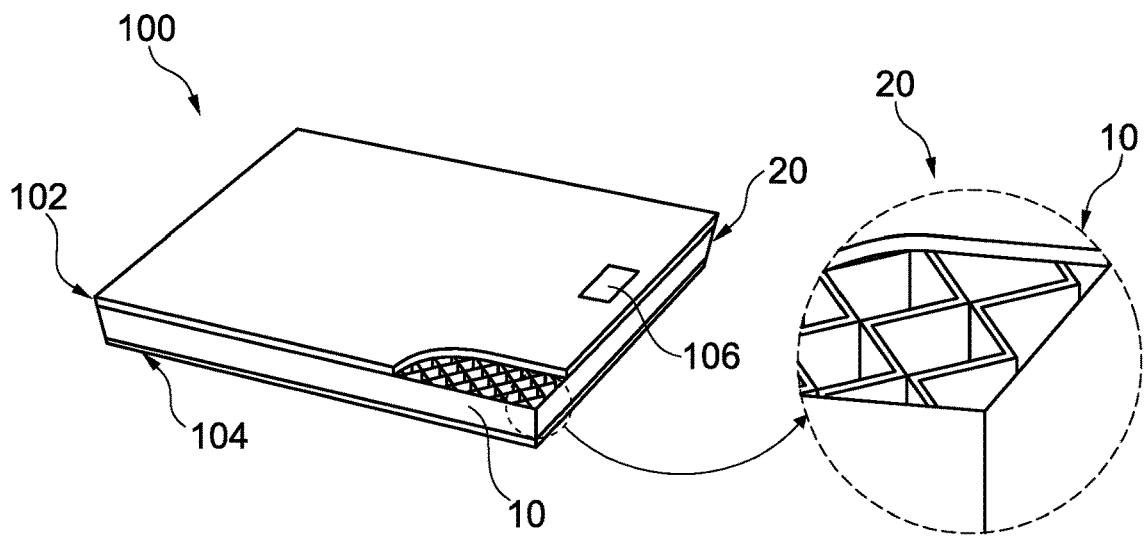
FIG. 2 shows a schematic perspective view of a sandwich component according to one embodiment of the invention.

FIG. 1 shows a battery core 10 for a sandwich component 100. The battery core 10 has a positive electrode layer 12, a separator layer 14 and a negative electrode layer 16. The separator layer 14 is arranged between the positive electrode layer 12 and the negative electrode layer 16. The positive electrode layer 12, the separator layer 14 and the negative electrode layer 16 comprise nanocellulose fibres 18. The battery core 10 is folded and forms a cellular structure 20 as a core for a sandwich component 100, as illustrated in FIG. 2.

FIG. 1 furthermore shows the battery core 10 in a curved form. Adding nanocellulose fibres 18 to the layers of the battery core 10 improves the mechanical flexibility properties and electrochemical properties of the battery core 10. This enables the battery core 10 to be folded and to be used as a cellular structure 20 for a sandwich component 100, as illustrated in FIG. 2.

The positive electrode layer 12 comprises $LiFePO_4$.

The separator layer 14 comprises $SiO_2$.

The negative electrode layer 16 comprises graphite.

By virtue of the substances mentioned, the battery core 10 is very environmentally friendly.

The battery core 10 has a thickness of at most 0.5 mm, preferably 0.3 mm. By virtue of these very thin battery cores 10, it is possible to make lightweight cellular structures for a sandwich component 100.

Using nanocellulose fibres 18 enables the layers 12, 14, 16 of the battery core 10 to be folded in a flexible manner while nevertheless having a required strength. As a result, it is possible to replace a conventional cellular core for a sandwich component 100, consisting, for example, of paper (not shown) folded into a cellular form, with a cellular core 20 which has comparable structural properties to the conventional cellular core and is simultaneously a battery. This has the effect that it is possible to make a multifunctional sandwich component which, in addition to properties as a support, also has properties as an energy storage device and energy source.

FIG. 2 shows a sandwich component 100 in perspective view and shows a detail of the cellular structure 20 of the sandwich component 100. The cellular structure 20 can also be referred to as a cellular core. The sandwich component 100 has an upper covering layer 102, a lower covering layer 104 and a battery core 10. The battery core 10 is arranged between the upper covering layer 102 and the lower covering layer 104. In one example, the upper covering layer 102 and the lower covering layer 104 can be adhesively bonded to the battery core 10. The detail shows that the cellular core 20 of the sandwich component 100 is composed of a folded battery core 10.

The sandwich component 100 furthermore has a connection device 106 for the connection of an electric conductor to the battery core 10.

In one example, the connection device 106 is supplied as a conventional plug.

In another example, the connection device 106 has a charging station, e.g. a "QI charging pad", which can transmit energy wirelessly.

In another example, the battery core 10 can be charged via the same connection device 106 or, alternatively, via a second connection device (not shown).

In one example, the second connection device is connected to the power circuit of an aircraft 500. A control unit (not shown) is designed to check the battery status and, if required, to start the charging process at certain times.

In one example, the upper cover plate 102 and the lower cover plate 104 are composed of a carbon fibre composite material (CFRP). The use of carbon fibre has the advantage of possessing good strength properties with a relatively low weight.

In another example, the lower cover plate 104 and the upper cover plate 102 are composed of a glass fibre composite material (GFRP).

In one example, the upper cover plate 102 and the lower cover plate 104 are adhesively bonded to the battery core 10.

In another example, the upper cover plate 102 and the lower cover plate 104 are connected positively to the battery core 10. For example, grooves are provided in the cover plates 102, 104 in order to insert the battery core 10 between the cover plates 102, 104.

In an example which is not shown, the folded battery core 10 forms a honeycomb structure or a structure which has quadrilateral cells.

Figure 5:
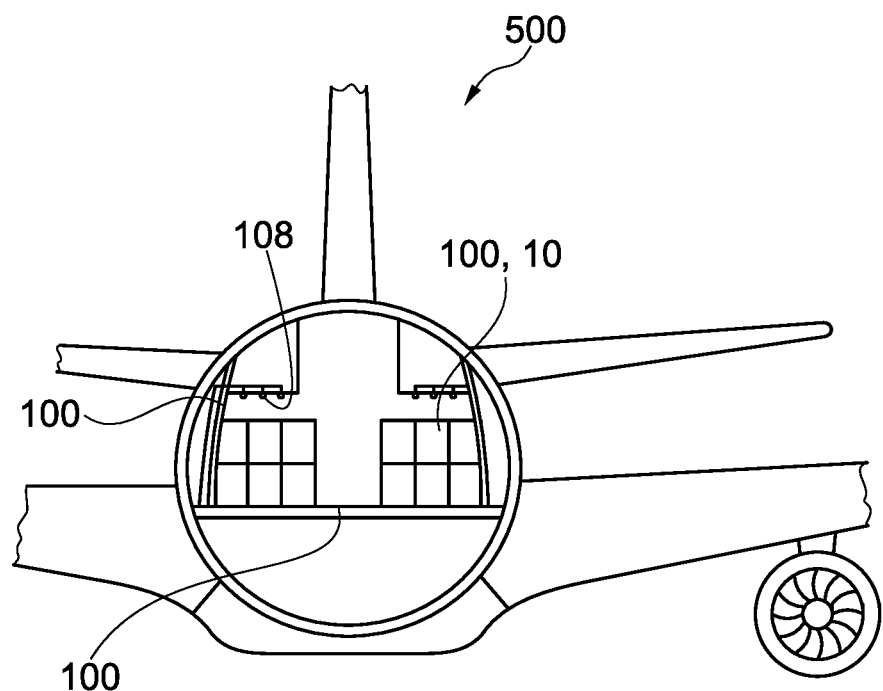
FIG. 5 shows a schematic illustration of an aircraft with a sandwich component.

In one example, the sandwich component 100 is a cabin covering, a floor panel, a side cladding or part of a cabin monument, e.g. a kitchen or a toilet (see FIG. 5).

Figure 3:
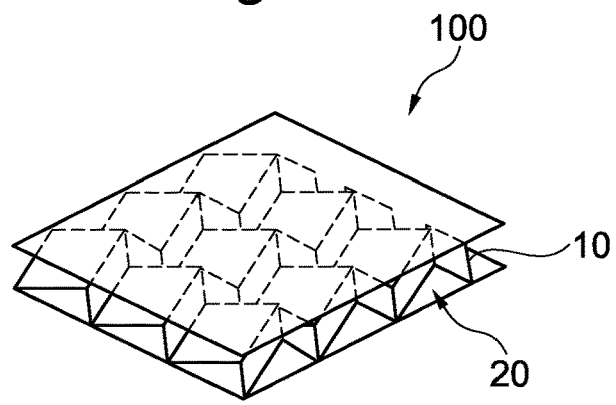
FIG. 3 shows a schematic perspective view of the sandwich component according to another embodiment of the invention, in particular another embodiment of the battery core.

FIG. 3 shows another embodiment of the battery core 10 in a sandwich component 100. The battery core 10 forms the cellular structure 20 of the sandwich component 100. In an example shown in FIG. 3, the battery core 10 forms a Miura structure. This type of folding has the advantage of producing a stable cellular core 20 in a simple manner.

The folded battery cores 10 form the cellular core 20 of the sandwich component 100 and can be arranged over the entire area of the sandwich component 100, i.e. of the cover plates 102, 104. As an alternative, the battery core 10 can also form just one part of a cellular core 20 of a sandwich component 100. For example, a conventional cellular core could be combined with a battery core 10 as a cellular core 20.

In an example which is not shown, a plurality of battery cores 10 can also be stacked one on top of the other between the upper cover plate 102 and the lower cover plate 104 in order to increase the capacitance of the battery storage device. This increases the thickness of the battery core 10 and of the sandwich component 100. However, it would thereby be possible to increase the battery capacitance for sandwich components 100 that are small in terms of area.

Figure 4:
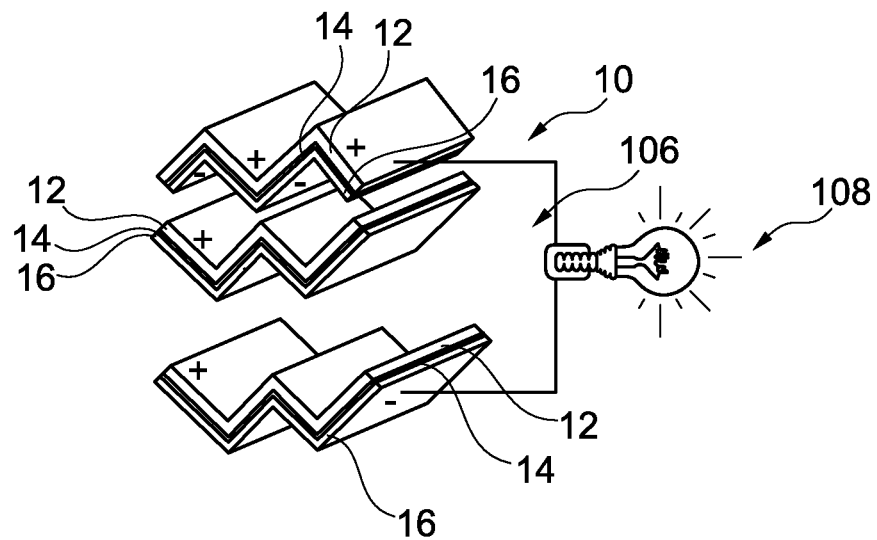
FIG. 4 shows a schematic illustration of the battery core according to another embodiment of the invention.

FIG. 4 shows another embodiment of the battery core 10 in a schematic view. The individual layers of the battery core 10, i.e. the positive electrode layer 12, the separator layer 14 and the negative electrode layer 16 form a battery strip. A plurality of these battery strips or layers can be arranged in relation to one another and form the battery core 10. The arrangement of the layers 12, 14, 16 can be a series or a parallel circuit. Depending on the arrangement of a plurality of the battery strips, voltages of different levels can be produced here. Depending on the voltage requirement of the loads 108 in the aircraft 500, the battery cores 10 can thus be adapted in a variable manner.

Via the connection device 106, the battery core can be connected to a load 108.

FIG. 5 shows an aircraft 500 which has a sandwich component 100 with a battery core 10 and has a load 108. The electric load 108, e.g. a light source, is connected to the battery core 10 and/or to the sandwich component 100 in an electrically conductive manner.

In one example, the loads 108 are coffee machines, monitors, light sources etc.

Figure 6:
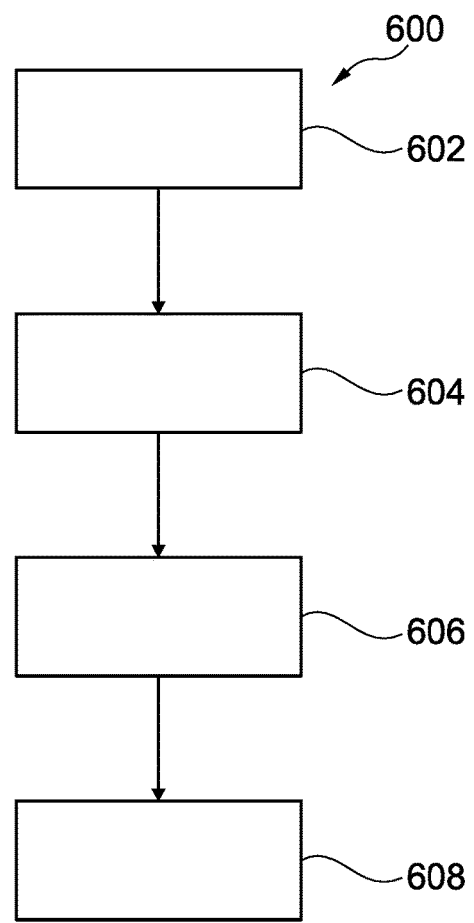
FIG. 6 shows a method for producing a folded battery core.

FIG. 6 shows a method 600 for producing a folded battery core 10. In a step 602, a battery strip is supplied, which has a positive electrode layer 12, a separator layer 14 and a negative electrode layer 16. The separator layer 14 is arranged between the positive electrode layer 12 and the negative electrode layer 16. All the layers 12, 14, 16 comprise nanocellulose fibres 18. In a further step 604, the battery strip is folded into a battery core 10 having a cellular structure 20 in order to form a core for a sandwich component 100.

In a step 606, interfaces between the cells of the cellular structure of the folded battery core 10 are adhesively bonded.

In another example, the method has the following step. In a step 608, the battery core 10 is connected to an upper covering layer 102 and a lower covering layer 104. For example, the two covering layers 102, 104 are adhesively bonded to the battery core 10.

Figure 7:
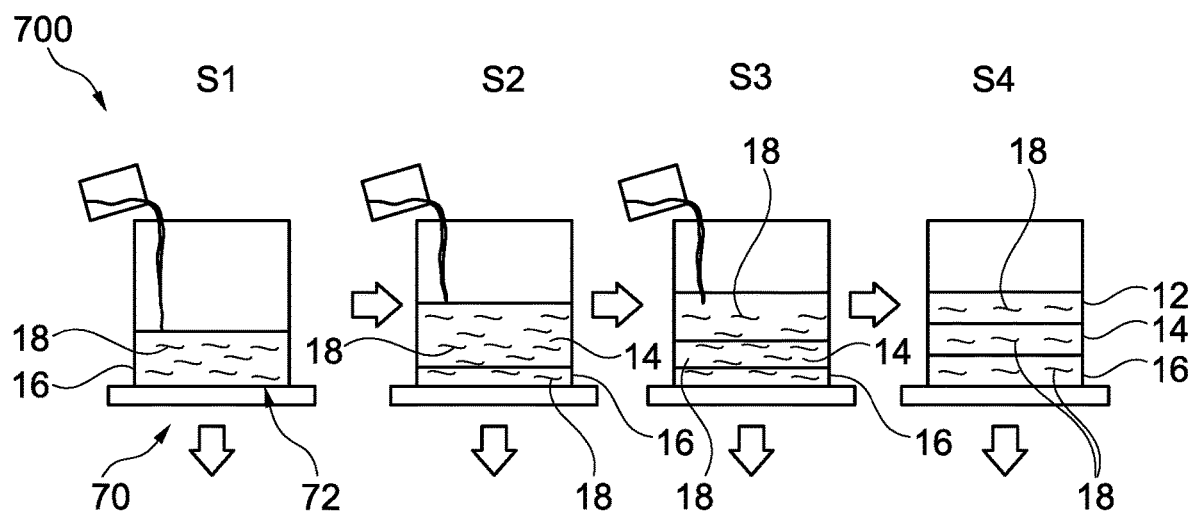
FIG. 7 shows a schematic illustration of a production process for the individual layers of a battery core according to one embodiment of the invention.

FIG. 7 shows a production process 700 for a battery strip. In a step S1, nanocellulose fibres (NFC) 18 as a dispersion and graphite are cast into a mould. This layer is arranged on an air- and water-permeable filter adjoining a region which is put under a vacuum 70. However, the graphite and the nanocellulose fibres 18 cannot pass through the filter. As a result, the layer consisting of nanocellulose fibres and graphite is sucked against the filter 72 and thus rests flat against the filter in the mould. This layer forms the negative electrode layer 16.

In a second step S2, nanocellulose fibres distributed in water and $SiO_2$ are cast onto the previous layer. This layer forms the separator layer 14.

In a third step S3, nanocellulose fibres distributed in water and $LiFePo_4$ are cast onto the two previous layers. This forms the positive electrode layer 12.

In a fourth step S4, the three layers are dried by the vacuum applied at the bottom of the mould and are thus compressed to form a battery. After the production process, the battery is in a flat state and forms a battery strip.

The illustrative embodiments described above can be combined in various different ways. In particular, it is also possible for aspects of the method to be used for embodiments of the devices and use of the devices and vice versa.

As an additional note, attention is drawn to the fact that "comprising" does not exclude other elements or steps and "a" or "an" does not exclude a multiplicity. Furthermore, it should be noted that features or steps which have been described with reference to one of the above illustrative embodiments can also be used in combination with other features or steps of the other illustrative embodiments described above. Reference signs in the claims should not be considered as restrictive.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A battery core for a sandwich component, comprising:
   a positive electrode layer;
   a separator layer; and a negative electrode layer, wherein the separator layer is arranged between the positive electrode layer and the negative electrode layer, wherein the positive electrode layer, the separator layer and the negative electrode layer have nanocellulose fibres, and wherein the battery core is folded and forms a cellular structure as a core for a sandwich component, the battery core having a first lateral edge and a second lateral edge opposite the first lateral edge, the first lateral edge configured to be attached to a lower covering layer and the second lateral edge configured to be attached to an upper covering layer.

2. The device according to claim 1, wherein the positive electrode layer comprises $LiFePO_4$.

3. The device according to claim 1, wherein the separator layer comprises $SiO_2$.

4. The device according to claim 1, wherein the negative electrode layer comprises graphite with a dispersion of the nanocellulose fibres.

5. The device according to claim 1, wherein the battery core has a thickness of at most 0.5 mm.

6. The device according to claim 1, wherein the battery core has a thickness of 0.3 mm.

7. The device according to claim 1, wherein the cellular structure has a honeycomb structure or has quadrilateral cells.

8. The device according to claim 1, wherein the battery core is flexible.

9. A sandwich component comprising:
an upper covering layer;
a lower covering layer; and
a battery core according to claim 1,
wherein the battery core is arranged between the upper covering layer and the lower covering layer such that the cellular structure forms the core for the sandwich component such that the battery core extends perpendicularly to the upper covering layer and the lower covering layer.

10. The sandwich component according to claim 9, wherein the sandwich component has a connection device for the connection of an electrical conductor to the battery core.

11. An aircraft comprising:
a battery core according to claim 1, and
an electric load,
wherein the electric load is connected in an electrically conductive manner to the battery core.

12. An aircraft comprising:
a sandwich component according to claim 9, and
an electric load,
wherein the electric load is connected in an electrically conductive manner to the sandwich component.

13. A method for producing a folded battery core, wherein the method comprises:
a) supplying a battery strip, which has a positive electrode layer, a separator layer and a negative electrode layer, wherein the separator layer is arranged between the positive electrode layer and the negative electrode layer, and all the layers comprise nanocellulose fibres; and
b) folding the battery strip into a battery core having a cellular structure as a core for a sandwich component, the battery core having a first lateral edge and a second lateral edge opposite the first lateral edge, the first lateral edge configured to be attached to a lower covering layer and the second lateral edge configured to be attached to an upper covering layer.

14. The method according to claim 13, wherein the method further comprises:
c) adhesive bonding of interfaces between cells of the cellular structure of the folded battery core.

15. The method according to claim 13, wherein the method further comprises:
d) connecting the battery core to the upper covering layer and the lower covering layer.

* * * * *